(12) United States Patent
Chien et al.

(10) Patent No.: US 7,685,680 B2
(45) Date of Patent: Mar. 30, 2010

(54) ROTATABLE SLIDE HINGE

(76) Inventors: Hsiang-Chi Chien, NO. 174, Chunying St, Shulin City, Taipei Hsien (TW); Wei-Chen Kao, NO. 174, Chunying St., Shulin City, Taipei Hsien (TW)

( * ) Notice: Subject to any disclaimer, the term of this patent is extended or adjusted under 35 U.S.C. 154(b) by 271 days.

(21) Appl. No.: 11/810,441

(22) Filed: Jun. 5, 2007

(65) Prior Publication Data
US 2008/0301909 A1    Dec. 11, 2008

(51) Int. Cl.
*E05D 15/06* (2006.01)
(52) U.S. Cl. .............................. 16/361; 16/358; 16/239; 16/296
(58) Field of Classification Search .................... 16/361, 16/357, 358, 359, 360, 362; 312/322, 323; 49/260, 261; 361/679.39; 455/575.4
See application file for complete search history.

(56) References Cited

U.S. PATENT DOCUMENTS 7,400,913 B2 * 7/2008 Richter et al. ............. 455/575.1
2006/0030381 A1 * 2/2006 Byun et al. ................ 455/575.4
2006/0046796 A1 * 3/2006 Park et al. ................. 455/575.4
2006/0046797 A1 * 3/2006 Chen ......................... 455/575.4
2006/0211460 A1 * 9/2006 Jeong et al. ............... 455/575.4
2006/0223596 A1 * 10/2006 Hur ........................... 455/575.4
2008/0004083 A1 * 1/2008 Ohki et al. .................. 455/566

* cited by examiner

*Primary Examiner*—Victor Batson
*Assistant Examiner*—Michael Lee

(57) ABSTRACT

A rotatable slide hinge has a stationary leaf, a moving leaf, a spring, a pivot pin assembly and a guide pin assembly. The stationary leaf has a top and a bottom. The moving leaf is mounted on the bottom of the stationary leaf, sliding and turning relative to the stationary leaf and has a top surface. The spring is attached to the top of the stationary leaf and has a stationary end and a moving end. The pivot pin assembly connects the stationary leaf and the moving leaf and allows the moving leaf to slide relative to the stationary leaf. The guide pin assembly extends through the moving end of the spring, the stationary leaf and the moving leaf to connect the stationary leaf, the spring and the moving leaf and allows the moving leaf to slide and turn relative to the stationary leaf.

4 Claims, 8 Drawing Sheets

ROTATABLE SLIDE HINGE

BACKGROUND OF THE INVENTION

1. Field of the Invention

The present invention relates to a slide hinge, and more particularly to a rotatable slide hinge that allows a moving leaf to slide and turn relative to a stationary leaf.

2. Description of Related Art

The advancement of science and technology has resulted in electronic devices such as cellular phones, Personal Digital Assistants and the like. Electronic devices comprise a base, a cover and a conventional hinge or slide hinge. The cover is mounted above the base to make the electronic device smaller. The conventional hinge connects the cover to the base along an axis and allows the cover to pivot relative to the base. The conventional slide hinge connects the cover to the base to allow the cover to slide relative to the base. However, some designs require the cover to turn and slide relative to the base, and neither the conventional hinge nor the conventional slide hinge can perform both of these actions.

To overcome the shortcomings, the present invention provides a rotatable slide hinge to mitigate or obviate the aforementioned problems.

SUMMARY OF THE INVENTION

The main objective of the invention is to provide a rotatable slide hinge that allows a moving leaf to slide and turn relative to a stationary leaf.

A rotatable slide hinge in accordance with the present invention comprises a stationary leaf, a moving leaf, a spring, a pivot pin assembly and a guide pin assembly. The stationary leaf has a top and a bottom. The moving leaf is mounted on the bottom of the stationary leaf, sliding and turning relative to the stationary leaf and has a top surface. The spring is attached to the top of the stationary leaf and has a stationary end and a moving end. The pivot pin assembly connects the stationary leaf and the moving leaf and allows the moving leaf to slide relative to the stationary leaf. The guide pin assembly extends through the moving end of the spring, the stationary leaf and the moving leaf to connect the stationary leaf, the spring and the moving leaf and allows the moving leaf to slide and turn relative to the stationary leaf.

Other objectives, advantages and novel features of the invention will become more apparent from the following detailed description when taken in conjunction with the accompanying drawings.

DETAILED DESCRIPTION OF PREFERRED EMBODIMENT

Figure 1:
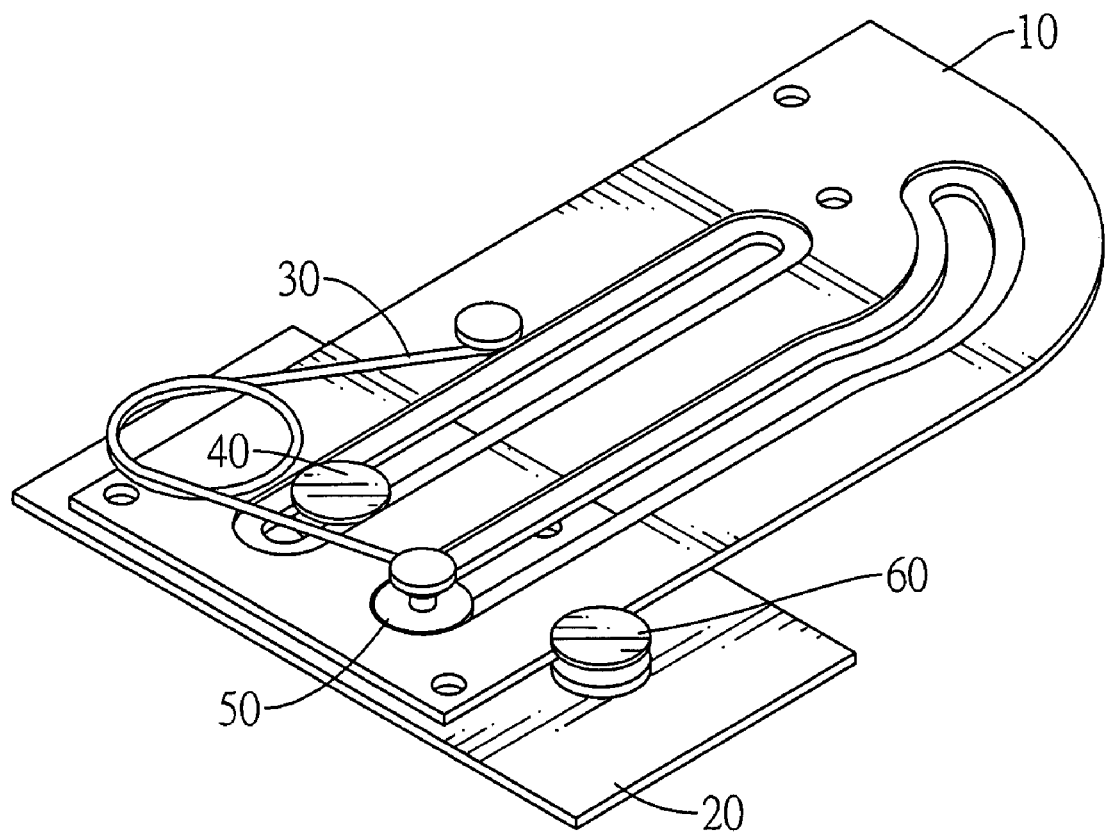
FIG. 1 is a perspective view of a first embodiment of a rotatable slide hinge in accordance with the present invention.
Figure 3:
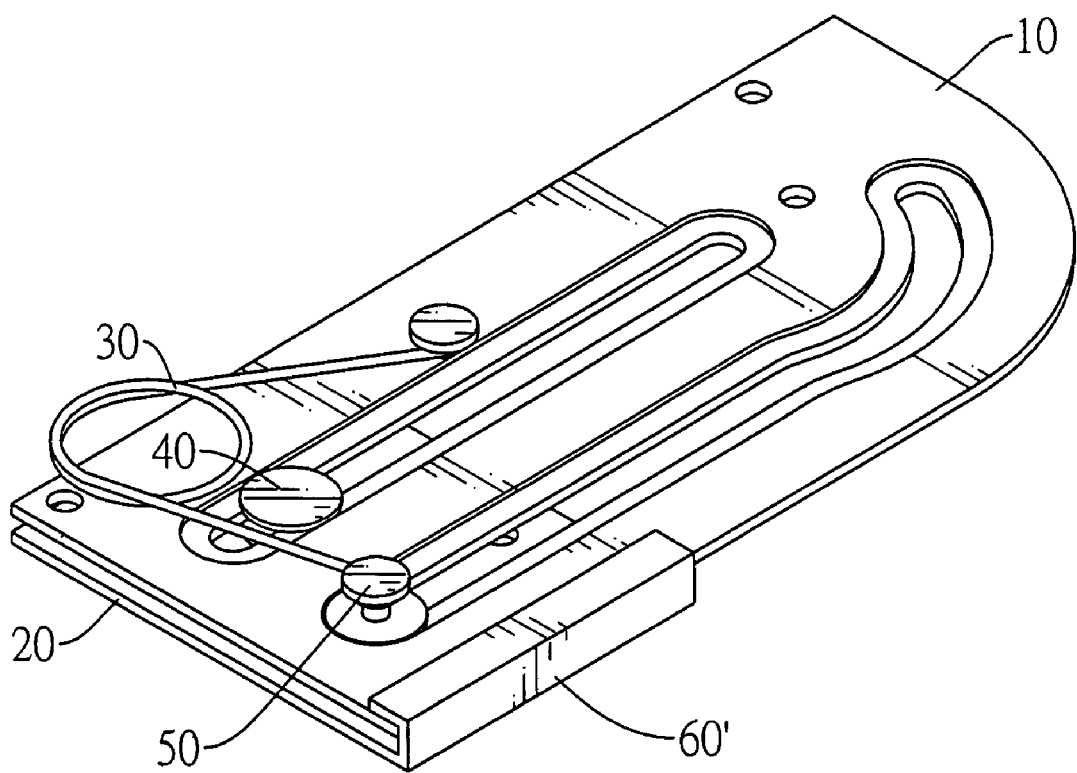
FIG. 3 is a perspective view of a second embodiment of a rotatable slide hinge in accordance with the present invention.

With reference to FIGS. 1 and 3, a rotatable slide hinge in accordance with the present invention comprises a stationary leaf (10), a moving leaf (20), a spring (30), a pivot pin assembly (40), a guide pin assembly (50) and directing assembly (60, 60').

Figure 2:
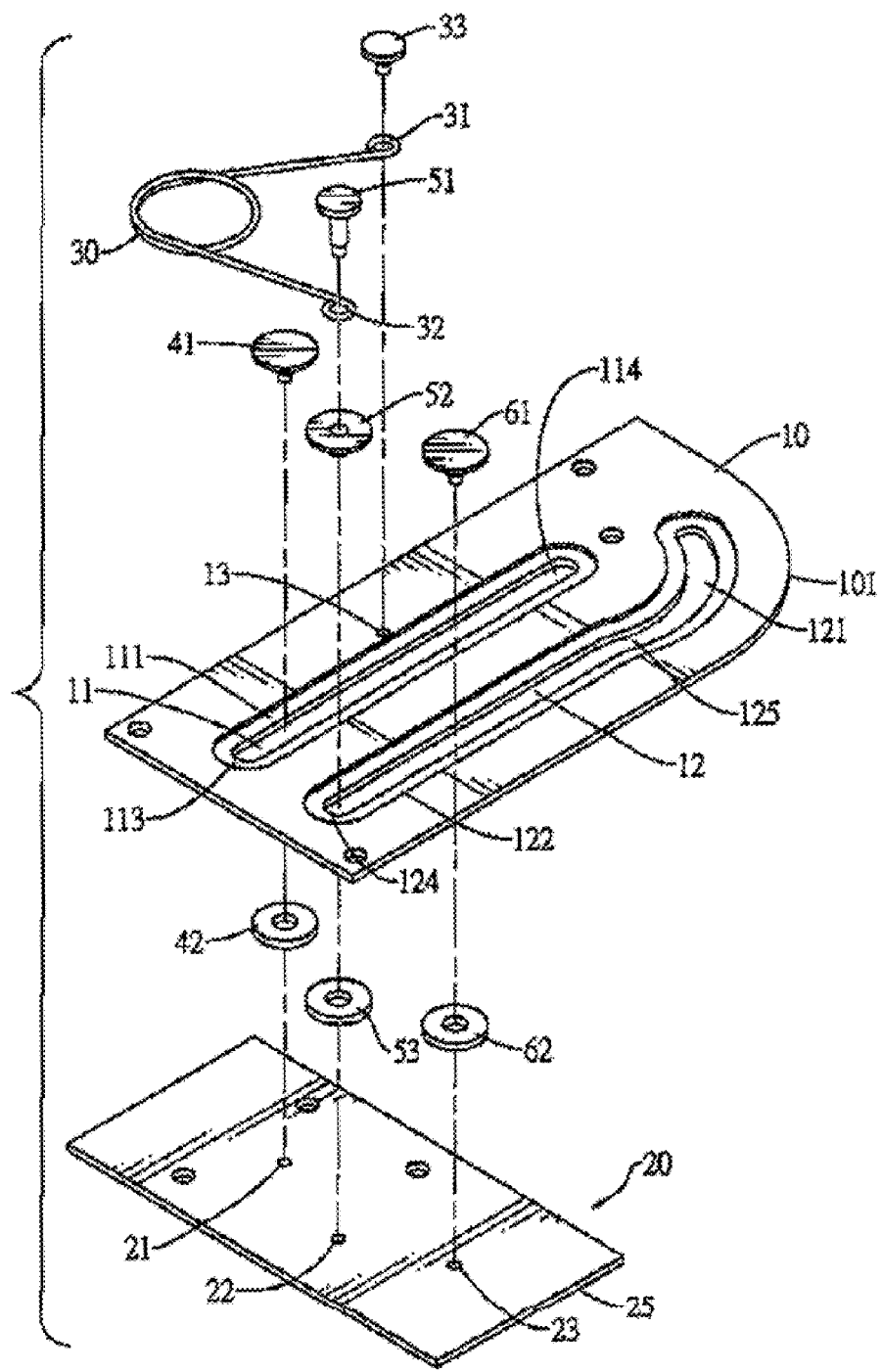
FIG. 2 is an exploded perspective view of the rotatable slide hinge in FIG. 1.
Figure 4:
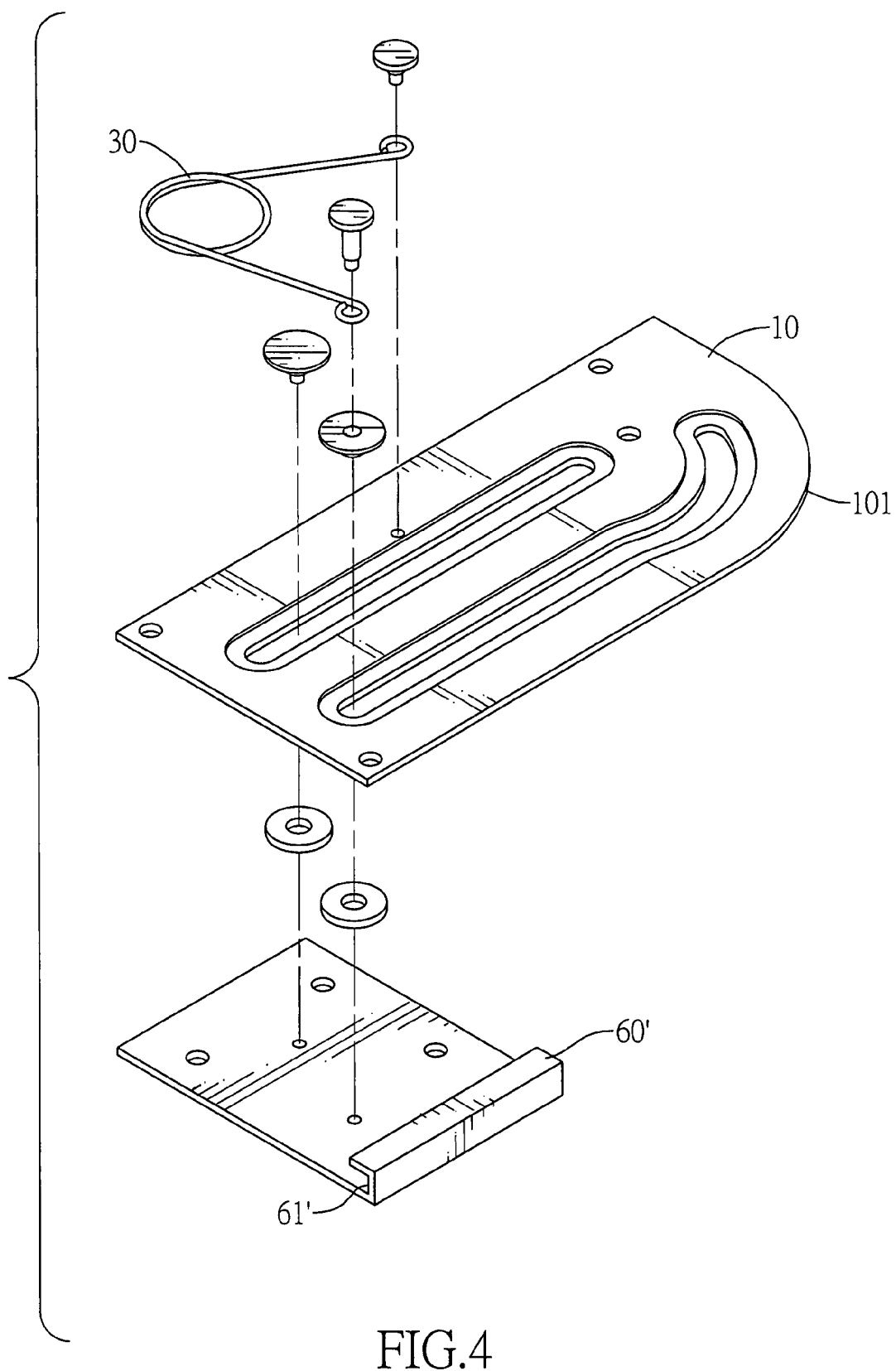
FIG. 4 is an exploded perspective view of the rotatable slide hinge in FIG. 3.

With further reference to FIGS. 2 and 4, the stationary leaf (10) has a top, a bottom, an arced edge (101), a slot (11), a guide channel (12), an arced channel (121) and a stationary spring hole (13). The slot (11) is formed through the stationary leaf (10), has a default limit (113) and a pivotal limit (114) and may comprise a lip (111). The lip (111) is formed around and protrudes into the slot (11).

Figure 6:
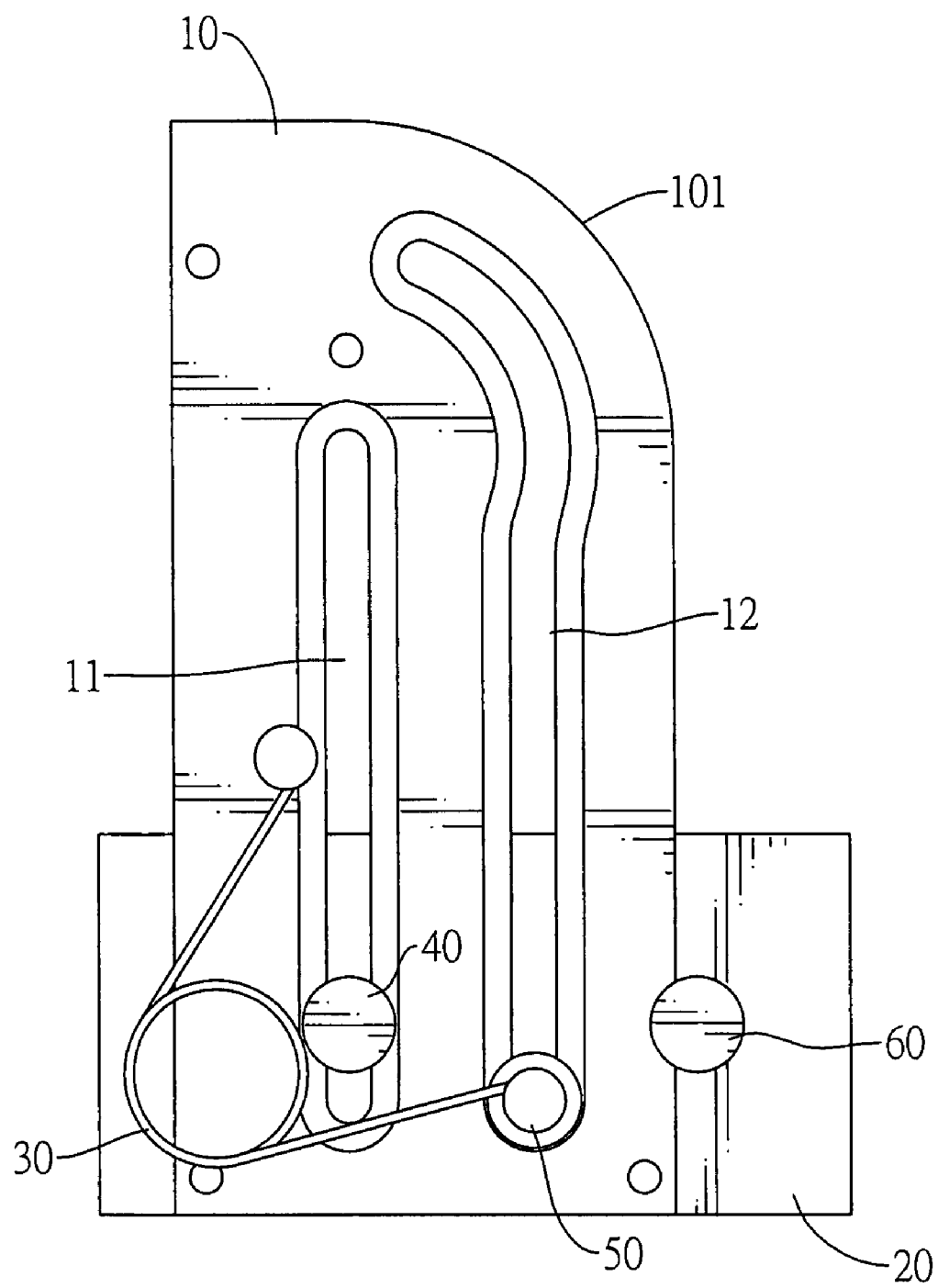
FIG. 6 is a top view of the rotatable slide hinge in FIG. 1.
Figure 7:
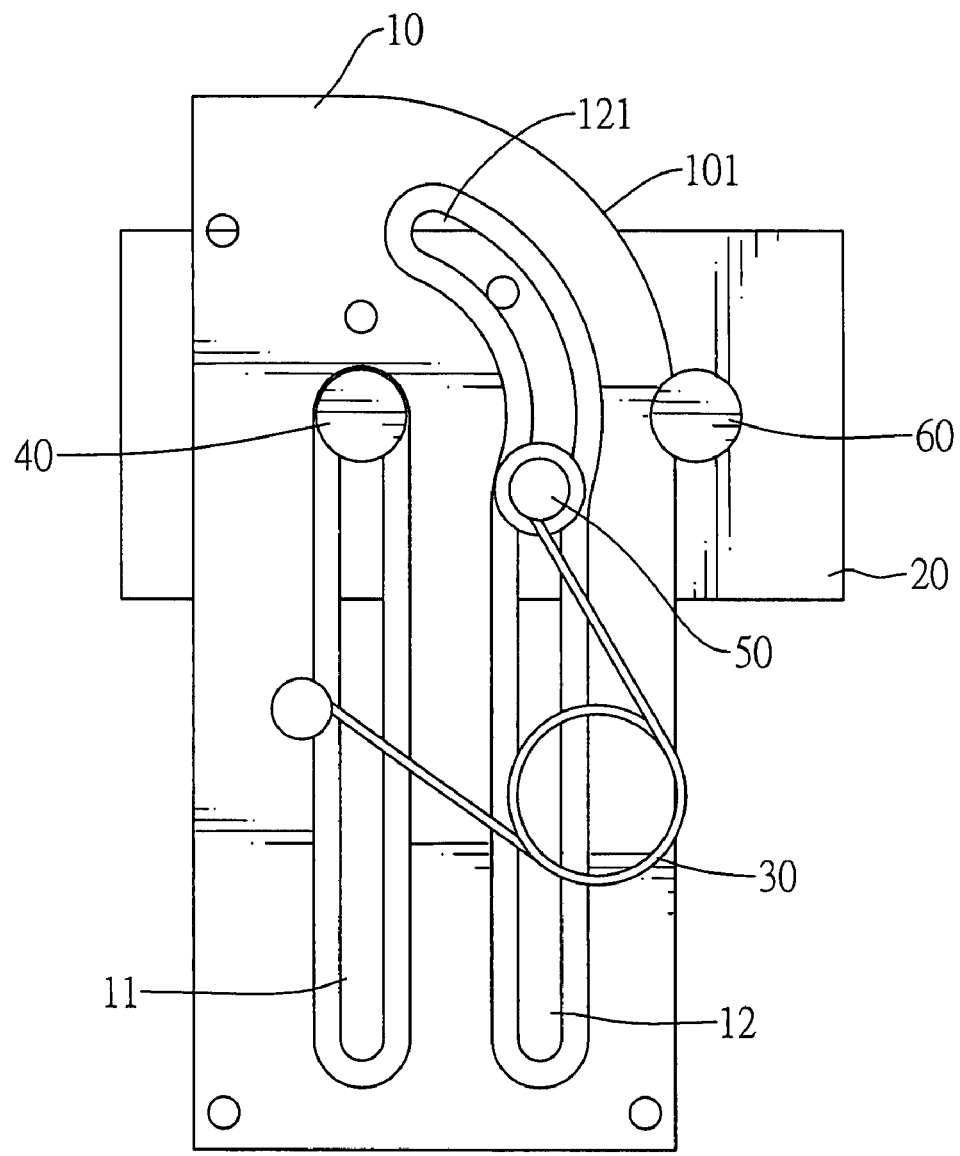
FIG. 7 is an operational top view of the rotatable slide hinge in FIG. 1.
Figure 8:
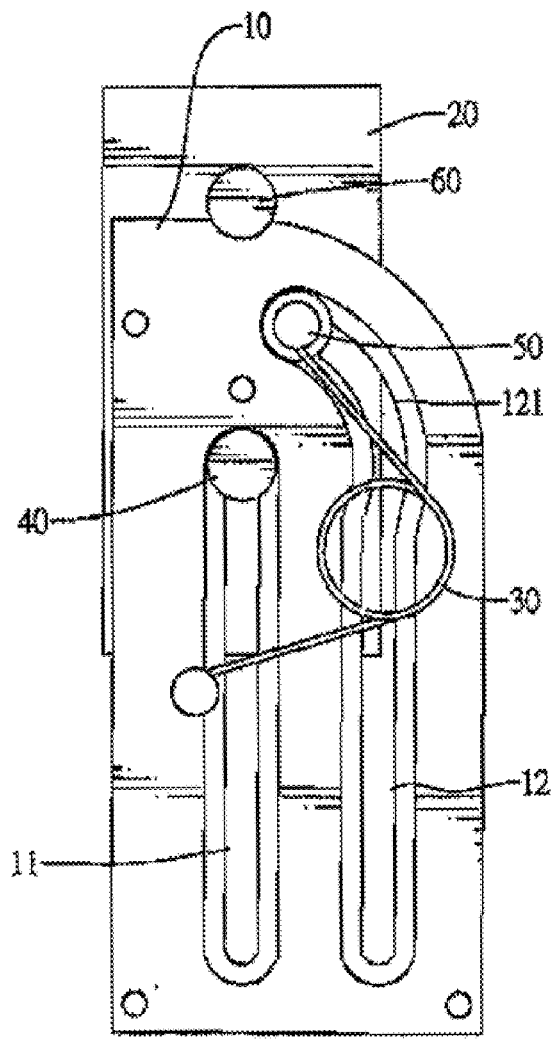
FIG. 8 is another operational top view of the rotatable slide hinge in FIG. 1.

The guide channel (12) is formed through the stationary leaf (10), is substantially parallel to the slot (11), has a default limit (124) and a pivotal point (125) and may comprise a lip (122). Preferably, the lengh of the guide channel (12) is roughly equal to or slightly shorter than that of the slot (11) as shown in FIGS. 2 and 8. The lip (122) is formed around and protrudes into the guide channel (12). The arced channel (121) extends from and communicates with the pivotal point (125) of the guide channel (12) and corresponds to the arced edge (101) of the stationary leaf (10). Preferably, the arced channel (121) is formed around a center, namely the pivotal limit (114) of the slot (11) as shown in FIGS. 6, 7 and 8.

The stationary spring hole (13) is formed in the stationary leaf (10).

The moving leaf (20) has a top surface, a guide edge(25) a pivot pin hole (21), a guide pin hole (22) and a directing pin hole (23) and is mounted on the bottom of the stationary leaf (10), slides and turns relative to the stationary leaf (10).

The guide edge (25) corresponds to the arced edge (101) of the stationary leaf (10).

The pivot pin hole (21) is formed in the top surface of the moving leaf (20) and corresponds to the slot (11) of the stationary leaf (10).

The guide pin hole (22) is formed in the top surface of the moving leaf (20) and corresponds to the guide channel (12) of the stationary leaf (10).

The directing pin hole (23) is formed in the top surface of the moving leaf(20).

Figure 5:
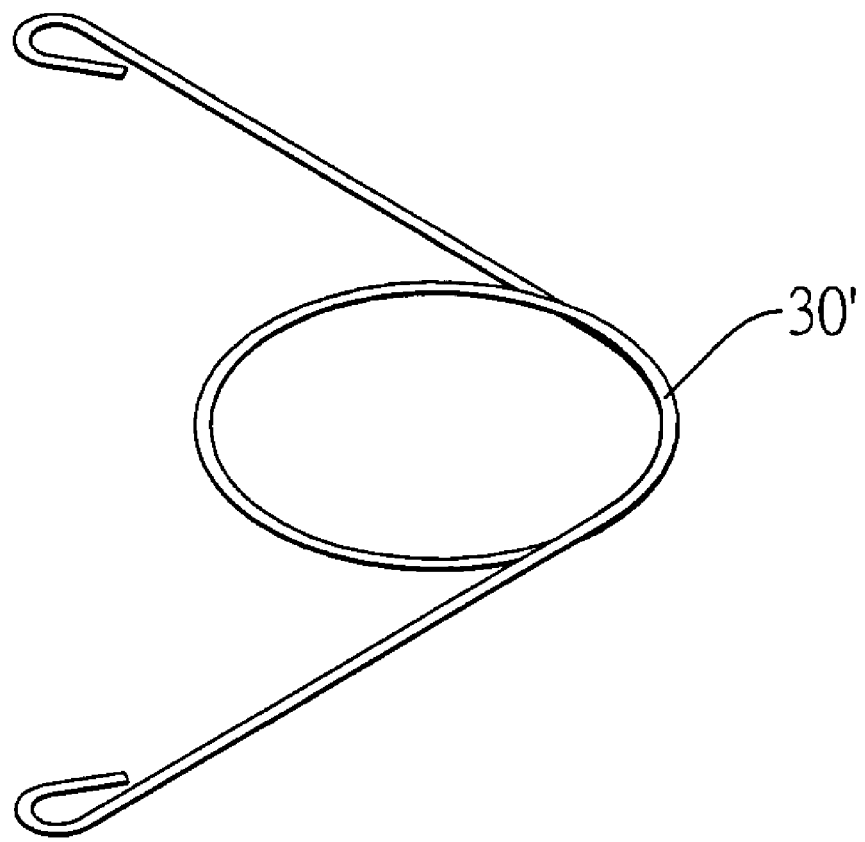
FIG. 5 is a perspective view of another embodiment of the spring being formed flat.

The spring (30) is attached to the top of the stationary leaf (10), has a stationary end (31) connected to the stationary spring hole (13), a moving end (32) connected to the guide pin hole (22) of the moving leaf (20) through the guide channel (12) of the stationary leaf (10). With further reference to FIG. 5 the spring (30') may be flat.

The spring (30) may be attached to the stationary leaf (10) using rivets, welds, a fastener (33) or other conventional fastening methods.

The fastener (33) extends through the stationary end (31) of the spring (30) and is mounted securely in the stationary spring hole (13) so that the spring (30) pivots about the fastener (33) fixed to the stationary spring hole(13).

The pivot pin assembly (40) connects the stationary leaf (10) and the moving leaf (20) to allow the moving leaf (20) to slide relative to the stationary leaf (10). The pivot pin assembly (40) comprises a pivot pin (41) and a pivot pin washer (42).

The pivot pin (41) extends through the slot (11) of the stationary leaf (10) and is mounted securely in the pivot pin hole (21) of the moving leaf (20).

The pivot pin washer (42) is mounted around the pivot pin (41) between the lip (111) of the slot (11) of the stationary leaf (10) and the moving leaf (20).

Accordingly, the pivot pin (41) and the pivot pin washer (42) clamp the lip (111) of the slot (11) of the stationary leaf (10) to allow the pivot pin assembly (40) to move stably in the slot (11) of the stationary leaf (10).

The guide pin assembly (50) extends through the moving end (32) of the spring (30) and the guide channel (12) of the stationary leaf (10) and is mounted on the moving leaf (20) to connect the stationary leaf (10), the spring (30) forces the moving leaf (20) to slide and automatically turn, about the pivotal limit (114) of the slot (11), relative to the stationary leaf (10) after the pivot pin (41) against the pivotal limit (114) of the slot (11). The guide pin assembly (50) comprises a guide pin (51), a guide pin washer (53) and a guide pin disc (52).

The guide pin (51) extends through the moving end (32) of the spring (30) and slides in the guide channel (12) and the arced channel (121) of the stationary leaf (10) and is mounted securely in the guide pin hole (22) of the moving leaf (20).

The guide pin washer (53) is mounted around the guide pin (51), is between the stationary and moving leaves (10, 20) and corresponds to the guide channel (12) and the arced channel (121) of the stationary leaf (10).

The guide pin disc (52) is mounted between the moving end (32) of the spring (30) and the lip (122) of the guide channel (12) of the stationary leaf (10) and corresponds to the guide channel (12) and the arced channel (121) of the stationary leaf (10). Accordingly, the guide pin disc (52) and the guide pin washer (53) clamp the lip (122) of the guide channel (12) of the stationary leaf (10) to allow the guide pin assembly (50) to move stably in the guide channel (12) and the arced channel (121).

The directing assembly (60, 60') corresponds to the arced edge (101) of the stationary leaf (10) and is mounted on the moving leaf (20) to guide the moving leaf (20) slidably along the arced edge (101).

A first embodiment of the directing assembly (60) comprises a directing washer (62) and a directing pin (61).

The directing washer (62) is mounted between the arced edge (101) and the moving leaf (20). The directing pin (61) abuts the arced edge (101) of the stationary leaf (10), extends through the directing washer (62) and is mounted securely in the directing pin hole (23) of the moving leaf (20).

Accordingly, the directing washer (62) and the directing pin (61) clamp the arced edge (101) of the stationary leaf (10) to allow the moving leaf (20) to move stably along the arced edge (101) of the stationary leaf (10).

A second embodiment of the directing assembly (60') is L shaped in cross section, is formed on and protrudes from the guide edge (25) of the moving leaf (20) corresponding to the arced edge (101) of the stationary leaf (10) and comprises an elongated notch (61').

The elongated notch (61') abuts the arced edge (101) of the stationary leaf (10) to allow the moving leaf (20) to move stably along the arced edge (101) of the stationary leaf (10).

With further reference to FIG. 6, the spring (30) keeps the guide pin assembly (50) at the default limit (124) of the guide channel (12) and the pivot pin assembly (40) near the default limit (113) of the slot (11).

With further reference to FIG. 7, when the moving leaf (20) is pushed to moved, the spring (30) releases its elastic forces so that the pivot pin assembly (40) and the guide pin assembly (50) respectively move along the slot (11) and guide channel (12) allowing the moving leaf (20) to slide. The directing assembly (60) also moves along the corresponding edged of the stationary leaf (10) to stably support the moving leaf (20).

With further reference to FIG. 8, when the pivot pin assembly (40) is limited by the pivotal limit (114) of the slot (11) and the moving leaf (20) is urged by the moving end (32) of the spring (30) to keeps moving, and turns about the pivotal limit (114) of the slot (11), namely the guide pin assembly (50) follows the arced channel (121) and the directing assembly (60) smoothly slides along the arced edged (101) to simultaneously helping the rotation of the moving leaf (20) relative to the stationay leaf (10) until the guide pin assembly (50) against the end of the arced edged (101). Therefore, the moving leaf (20) slides relatives to the stationary leaf (10) for a predetermined distance, is urged by the spring (30) to pivots about the pivot pin assembly (40) and then is rotated relative to the stationary leaf (10).

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A rotatable slide hinge comprising:
   a stationary leaf having
      an arced edge;
      a slot having a default limit, a pivotal limit and a lip formed around and protruding into the slot;
      a guide channel being parallel to the slot, and having a default limit, a pivotal point and a lip formed around and protruding into the guide channel;
      an arced channel extending from and communicating with the pivotal point of the guide channel and corresponding to the arced edge of the stationary leaf (10), wherein the arced channel is formed around the pivotal limit; and
      a stationary spring hole formed in the stationary leaf;
   a moving leaf mounted on a bottom of the stationary leaf, sliding and turning relative to the stationary leaf and having
      a guide edge corresponding to the arced edge of the stationary leaf;
      a pivot pin hole formed in a top surface of the moving leaf and connected to the slot of the stationary leaf via a pivot pin, wherein the pivot pin is provided with a pivot pin washer to clamp the lip of stationary leaf;
      a guide pin hole formed in the top surface of the moving leaf and connected to guide channel of the stationary leaf via a guide pin, wherein the guide pin is provided with a pivot pin washer to clamp the lip of the stationary leaf; and
      a directing pin hole formed in the top surface of the moving leaf;
   a spring attached to the stationary leaf and having
      a stationary end connected to the stationary spring hole of the stationary leaf; and
      a moving end connected to the guide pin hole of the moving leaf through the guide channel of the stationary leaf via the guide pin; and
   a directing assembly corresponding to the arced edge of the stationary leaf, mounted on the moving leaf to guide the moving leaf slidably along the arced edge and having
      a directing washer mounted between the arced edge of the stationary leaf and the moving leaf; and a directing pin abutting the arced edge of the stationary leaf, extending through the directing washer and mounted securely in the directing pin hole of the moving leaf;

wherein the spring forces the moving leaf to move relative to the stationary leaf for a predetermined distance, and then the moving leaf rotates about the pivot pin until the guide pin abuts against the an end of the arced channel of the stationary leaf.

2. The rotatable slide hinge as claimed in claim 1, wherein the length of the guide channel is slightly shorter than that of the slot.

3. The rotatable slide hinge as claimed in claim 1, wherein the length of the guide channel is equal to that of the slot.

4. A rotatable slide hinge comprising:
   a stationary leaf having
      an arced edge;
      a slot having a default limit, a pivotal limit and a lip formed around and protruding into the slot;
      a guide channel being parallel to the slot, and having a default limit, a pivotal point and a lip formed around and protruding into the guide channel;
      an arced channel extending from and communicating with the pivotal point of the guide channel and corresponding to the arced edge of the stationary leaf, wherein the arced channel is formed around the pivotal limit; and
      a stationary spring hole formed in the stationary leaf;
   a moving leaf mounted on a bottom of the stationary leaf, sliding and turning relative to the stationary leaf and having
      a guide edge corresponding to the arced edge of the stationary leaf;
      a pivot pin hole formed in a top surface of the moving leaf and connected to the slot of the stationary leaf via a pivot pin, wherein the pivot pin is provided with a pivot pin washer to clamp the lip of stationary leaf; and
      a guide pin hole formed in the top surface of the moving leaf and connected to guide channel of the stationary leaf via a guide pin, wherein the guide pin is provided with a pivot pin washer to clamp the lip of the stationary leaf;
   a spring attached to the stationary leaf and having
      a stationary end connected to the stationary spring hole of the stationary leaf; and
      a moving end connected to the guide pin hole of the moving leaf through the guide channel of the stationary leaf via the guide pin;
   a directing assembly having an L-shaped cross section, formed on and protruding from a guide edge of the moving leaf and comprising
      an elongated notch abutting the arced edge of the stationary leaf to allow the moving leaf to move stably along the arced edge of the stationary leaf;
   wherein the spring forces the moving leaf to move relative to the stationary leaf for a predetermined distance, and then the moving leaf rotates about the pivot pin until the guide pin abuts against an end of the arced channel of the stationary leaf.

* * * * *